United States Patent
Moffatt et al.

(10) Patent No.: US 8,723,720 B2
(45) Date of Patent: May 13, 2014

(54) WIRELESS LOCATION DETECTION AND/OR TRACKING DEVICE AND ASSOCIATED METHODS

(75) Inventors: Christopher Douglas Moffatt, Palm Bay, FL (US); James G. Tonti, Valkaria, FL (US)

(73) Assignee: Harris Corporation, Melbourne, FL (US)

( * ) Notice: Subject to any disclaimer, the term of this patent is extended or adjusted under 35 U.S.C. 154(b) by 418 days.

(21) Appl. No.: 13/099,472

(22) Filed: May 3, 2011

(65) Prior Publication Data

US 2012/0280862 A1    Nov. 8, 2012

(51) Int. Cl.
*G01S 13/00* (2006.01)
*G01S 13/74* (2006.01)
*G01S 13/08* (2006.01)

(52) U.S. Cl.
USPC .................. 342/42; 342/29; 342/51; 342/118; 342/125; 342/175

(58) Field of Classification Search
USPC ......... 342/29–32, 42–51, 118, 125, 146, 147, 342/175
See application file for complete search history.

(56) References Cited

U.S. PATENT DOCUMENTS

| | | | | |
|---|---|---|---|---|
| 2,907,999 | A * | 10/1959 | Wadley | 342/125 |
| 3,701,151 | A * | 10/1972 | Sato et al. | 342/109 |
| 3,984,835 | A * | 10/1976 | Kaplan et al. | 342/44 |
| 4,075,632 | A * | 2/1978 | Baldwin et al. | 342/51 |
| 4,170,773 | A * | 10/1979 | Fitzsimmons et al. | 342/42 |
| 4,278,977 | A * | 7/1981 | Nossen | 342/42 |
| 4,307,397 | A * | 12/1981 | Holscher | 342/125 |
| 4,315,260 | A * | 2/1982 | Kupfer | 342/86 |
| 4,464,662 | A * | 8/1984 | Tomasi | 342/87 |
| 4,646,092 | A * | 2/1987 | Schreuder | 342/125 |
| 4,728,955 | A * | 3/1988 | Hane | 342/140 |
| 4,804,961 | A * | 2/1989 | Hane | 342/125 |
| 5,126,746 | A * | 6/1992 | Gritton | 342/125 |
| 5,339,073 | A * | 8/1994 | Dodd et al. | 340/5.61 |

(Continued)

FOREIGN PATENT DOCUMENTS

WO      0129574    4/2001

OTHER PUBLICATIONS

Miyamoto et al., "An active integrated retrodirective transponder for remote information retrieval-on-demand", IEEE Transactions on Microwave Theory & Techniques, nol. 49, No. 9, Sep. 2001, pp. 1658-1663.

(Continued)

*Primary Examiner* — Peter Bythrow
(74) *Attorney, Agent, or Firm* — Allen, Dyer, Doppelt, Milbrath & Gilchrist, P.A.

(57) ABSTRACT

The wireless detection beacon is for use with a Radio Frequency (RF) interrogator transmitting at a first frequency and receiving at a second frequency. The wireless detection beacon includes a substrate, a power supply carried by the substrate, an antenna assembly carried by the substrate, and a local oscillator (LO) carried by the substrate and configured to be powered by the power supply to provide an LO signal at a third frequency. A mixer is carried by the substrate and coupled to the antenna assembly and the LO. The mixer is configured to generate an outgoing beacon signal to the antenna assembly at the second frequency based upon mixing an incoming signal from the RF interrogator at the first frequency with the LO signal at the third frequency.

13 Claims, 6 Drawing Sheets

(56) References Cited

U.S. PATENT DOCUMENTS

| | | | |
|---|---|---|---|
| 5,649,295 A * | 7/1997 | Shober et al. | 340/10.1 |
| 5,649,296 A * | 7/1997 | MacLellan et al. | 455/39 |
| 5,703,573 A * | 12/1997 | Fujimoto et al. | 340/10.3 |
| 5,784,686 A * | 7/1998 | Wu et al. | 455/45 |
| 5,873,025 A * | 2/1999 | Evans et al. | 455/63.1 |
| 5,929,779 A * | 7/1999 | MacLellan et al. | 340/10.2 |
| 5,952,922 A * | 9/1999 | Shober | 340/572.4 |
| 6,046,683 A * | 4/2000 | Pidwerbetsky et al. | 340/10.4 |
| 6,838,989 B1 * | 1/2005 | Mays et al. | 340/572.1 |
| 6,868,073 B1 * | 3/2005 | Carrender | 370/278 |
| 6,950,483 B2 | 9/2005 | Chiodini | H04L 7/00 |
| 7,079,610 B1 | 7/2006 | Johansson et al. | H04B 1/10 |
| 7,098,769 B2 * | 8/2006 | Ott | 340/5.61 |
| 7,109,844 B2 * | 9/2006 | Taki et al. | 340/10.1 |
| 7,405,662 B2 * | 7/2008 | Steinke et al. | 340/572.4 |
| 7,580,378 B2 * | 8/2009 | Carrender et al. | 370/278 |
| 7,676,205 B2 * | 3/2010 | Moffatt et al. | 455/226.1 |
| 7,714,773 B2 * | 5/2010 | Ozaki et al. | 342/118 |
| 7,733,239 B2 * | 6/2010 | Nordmeyer | 342/125 |
| 7,859,387 B2 * | 12/2010 | Friedrich | 340/10.1 |
| 8,188,908 B2 * | 5/2012 | Landt | 342/51 |
| 8,274,426 B2 * | 9/2012 | Lee | 342/125 |
| 2005/0012653 A1 * | 1/2005 | Heide et al. | 342/42 |
| 2005/0099333 A1 * | 5/2005 | Gila et al. | 342/118 |
| 2005/0233696 A1 * | 10/2005 | Friedrich | 455/41.2 |
| 2006/0012464 A1 * | 1/2006 | Nitzan et al. | 340/10.1 |
| 2006/0157900 A1 * | 7/2006 | Nordmeyer | 267/64.21 |
| 2008/0070532 A1 * | 3/2008 | Moffatt et al. | 455/226.1 |
| 2009/0115603 A1 | 5/2009 | Tabe | |
| 2009/0195438 A1 * | 8/2009 | Kawai | 342/127 |
| 2009/0290660 A1 | 11/2009 | Neugebauer | |
| 2010/0328073 A1 * | 12/2010 | Nikitin et al. | 340/572.1 |
| 2011/0129023 A1 * | 6/2011 | Hoffmann et al. | 375/260 |

OTHER PUBLICATIONS

"Optimal Sequences for Channel Estimation Using Discrete Fourier Transform Techniques", by Tellambura et al., IEEE Transactions on Communications, vol. 47, Issue No. 2, pp. 230-238, Feb. 1999.

"Extremal Problem for Polynomials", by Newman, Proc. Amer. Math. Soc., vol. 16, pp. 1287-1290, Dec. 1965.

"On Minimizing the Peak-to-Average Power Ratio for the Sum of N Sinusoids", by Gimlin et al., IEEE Transactions on Communications, vol. 41, No. 4, pp. 631-635, Apr. 1993.

"Interpolation and Decimation of Digital Signals—A Tutorial Review", by Crochiere et al., Proceedings of the IEEE, vol. 69, No. 3, pp. 300-331, Mar. 1981.

"Signal Enhancement—A Composite Property Mapping Algorithm", by Cadzow, IEEE Trans. on Acoustics, Speech, and Signal Processing, vol. ASSP-36, No. 1, pp. 49-62, Jan. 1988.

"Improved Algorithm for Noniterative Time-Domain Model Fitting to Exponentially Damped Magnetic Resonance Signals", by Barkhuijsen et al., Journal of Magnetic Resonance, 73, pp. 553-557 (1987).

"Total Least Squares Based Algorithm for Time-Domain NMR Data Fitting", by Van Huffel, et al., ESAT Laboratory-Katholickle Universiteit Leuven, Kardinaal Mercierlaan 94, 3001 Leuven-Heverlee, Belgium, 1993.

"Estimating the Parameters of Exponentially Damped Sinusoids and Pole-Zero Modeling in Noise", by Kumaresan et al., IEEE Trans, Acoust., Speech, Signal Process., ASSP-30:833-840, 1982.

"Symbol Time Offset Estimation in Coherent OFDM Systems", by Landstrom et al., IEEE Transactions on Communications, vol. 50, No. 4, pp. 545-549, Apr. 2002.

"Low-Complex Frame Synchronization in OFDM Systems", by van de Beek et al., Universal Personal Communications, 1995. Record., 1995 Fourth IEEE International Conference on Nov. 6-10, 1995, pp. 982-986.

"Transmission Techniques for Digital Terrestrial TV Broadcasting", by Sari et al., IEEE Communications Magazine, Feb. 1995, pp. 100-109.

"OFDM Channel Estimation by Singular Value Decomposition", by Edfors et al., IEEE Transactions on Communications, vol. 46, No. 7, pp. 931-939, Jul. 1998.

* cited by examiner

WIRELESS LOCATION DETECTION AND/OR TRACKING DEVICE AND ASSOCIATED METHODS

FIELD OF THE INVENTION

The present invention relates to the field of wireless communications, and, more particularly, to wireless detection and ranging and related methods.

BACKGROUND OF THE INVENTION

It may be useful to determine a location and/or a distance of a remote wireless beacon. More particularly, it may be useful to use the beacon to determine a location of an object or person, such as a firefighter within a building, for example. Beacons may also be deployed to enhance navigational capabilities, such as providing 3D navigation for ships within ports.

A remote wireless beacon may be used in determining the location of the remote object or person. A remote beacon generally receives a transmitted signal from a remote transmitter and processes and transmits a return signal based upon the transmitted signal. For example, the return signal of a typical location beacon may provide timing information to assist in determining a range to the remote device. Alternatively, a GPS-determined location may be included in the return signal from a conventional navigation beacon. In accordance with the present invention, the beacon described herein generates the return signal by mixing the incoming signal with the local oscillator signal without requiring any decoding of the input signal. This configuration provides the lowest latency possible and minimizes return delay.

U.S. Patent Application Publication No. 2008/0070532 to Moffatt et al. and assigned to assignee of the present application, Harris Corporation of Melbourne, Fla., and incorporated herein by reference, discloses actively determining the range of (i.e. distance to) a remotely located radio transmitter, receiver, or radio transceiver. The method includes monitoring RF emissions of the RF receiver, generating an RF signal on an RF frequency that can be received by the RF receiver, and detecting a variation in the receiver RF emission or emissions responsive to the RF signal. The variation in the RF emission includes small changes in one or more of the amplitude, phase, or frequency of one or more local oscillator signals, harmonics thereof, or mixing products in the receiver. These changes are caused by the transmitted RF signal's influence on the receiver's circuitry. The transmitted RF signal can be used to cause a phase, frequency, amplitude, or combination of phase, frequency, or amplitude modulation of certain signals in the receiver. Such modulation can be caused by various aspects of the receiver design, such as intended or unintended coupling that exists between the local oscillator and other components of the receiver.

Other ranging methods, for example, a ranging algorithm, may be used to compute a distance between two radio transceivers. A basic ranging algorithm may compute correlation in the time domain between a transmitted signal and a received signal. A peak of such correlation may be related to the round trip time delay, often specified in samples. If the delay is some fraction of a sample, the peak may be smeared in the correlation. This may be greatly affected by noise and multipath, for example. A typical ranging technique may include a curve fit, neighbor weighting, or another technique to attempt to resolve delays.

U.S. patent application Ser. No. 12/629,584 to Hoffmann et al. and assigned to assignee of the present application, Harris Corporation of Melbourne, Fla., and incorporated herein by reference, discloses a multi-carrier waveform for actively determining a fine range estimate of a remotely located wireless device. This multi-carrier waveform may be used to improve time resolution and range accuracy. The RF interrogator may be configured to generate the multi-carrier base waveform as a multi-carrier orthogonal frequency division multiplexed (OFDM) base waveform, for example. The multi-carrier waveform may be constructed with a low peak-to-average power ratio of about 2.6 dB, regardless of the number of subcarriers, for efficient transmission using a power amplifier. The multi-carrier waveform may be transmitted at the first RF frequency to the remote wireless device, such as a beacon device. The signal processing engine may also process the frequency domain data by at least determining a channel estimate of the return waveform. The channel estimate may be based upon a mathematical inversion of the ratio of the received-to-transmitted sounder waveform, for example. The signal processing engine may also process the frequency domain data by at least resolving frequencies in a channel estimate of the frequency domain data, and resolve frequencies in the channel estimate based upon a singular value decomposition (SVD), for example. Frequency offset may result from Doppler due to a mobile RF interrogator, mobile wireless beacon, or both. Frequency offset may also occur from the LO frequency at the wireless beacon. The RF interrogator may also process the frequency domain data by at least reducing noise in the channel estimate and removing frequency offset. Thus, the multi-carrier waveform may be used to obtain an accurate round-trip time from the RF interrogator to the wireless beacon in order to estimate an accurate distance, referred to as fine range resolution.

Further, by incorporating multiple receiver and/or transmit antennas in the beacon, a Multiple-Input/Multiple-Output implementation (MIMO) may be used to provide spatial-diversity and discriminate different beacons coexisting on the same frequency and to improve location accuracy and/or data capacity.

There is a persistent need for a low complexity beacon having low cost and ease of production to provide location detection and/or tracking of disadvantaged nodes, i.e. items that do not already include a radio transmitter, receiver, or transceiver. Such a beacon should be low Size, Weight, and Power (SWAP).

SUMMARY OF THE INVENTION

In view of the foregoing background, it is therefore an object of the present invention to provide a relatively simple wireless detection beacon for location detection and/or tracking.

This and other objects, features, and advantages in accordance with the present invention are provided by a wireless detection beacon for use with, a Radio Frequency (RF) interrogator transmitting at a first frequency and receiving at a second frequency. The wireless detection beacon includes a substrate, a power supply carried by the substrate, an antenna assembly carried by the substrate, and a local oscillator (LO) carried by the substrate and configured to be powered by the power supply to provide an LO signal at a third frequency. A mixer is carried by the substrate and coupled to the antenna assembly and the LO. The mixer is configured to generate an outgoing beacon signal to the antenna at the second frequency based upon mixing an incoming signal from the RF interrogator at the first frequency with the LO signal at the third frequency.

In order to perform the frequency conversion process from received RF signals to IF, superheterodyne receivers commonly perform a mixing operation that involves two signals. These signals include a signal produced by the local oscillator and an incoming RF signal. This process is performed in a mixer or mixing stage of the receiver. Within the mixer, the local oscillator signal interacts with the received RF signal to produce outputs known as mixing products at frequencies which are equal to the sum of the two input frequencies and difference of the two input frequencies. Other mixing products are also produced that are integer multiples of the sum and difference products, and are generally lower in amplitude than the sum and difference products.

The mixer may be configured to generate the outgoing beacon signal as a mixing product signal at the second frequency defined by a sum of the first and third frequencies and permitting range and direction finding by the RF interrogator. The mixer may also be configured to generate the outgoing signal as a mixing product signal at a different second frequency defined by the difference between the first and third frequencies. The mixer may also be configured to generate the outgoing signal as one or more mixing product signals produced as sum and difference products of integer multiples of the first and third frequencies, and may be harmonically related to the incoming RF signal and the LO signal.

Conventional transponder beacons receive and decode the interrogating waveform and then generate a corresponding response waveform back to the RF interrogator. Consistent with the present invention, the beacon may be configured to generate the outgoing beacon signal by re-radiating the incoming input signal mixed with the LO signal and without any decoding of the incoming signal.

An input antenna may be configured to receive the incoming signal, and an output antenna configured to transmit the outgoing beacon signal, with the mixer being coupled therebetween. This concept may be expanded to include multiple input antennas, output antennas, and mixers for Multiple-Input/Multiple Output (MIMO) operation. Filters may be coupled between the one or more input antennas and one or more mixers, and/or between one or more mixers and the one or more output antennas. Modulation may be provided at the beacon to perturb the return signal for distinguishing between beacons and/or encoding information. Encoded information may include beacon identification number, serial number, sensor data, or other user data. Orthogonal codes may be modulated for distinguishing between beacons, similar to those used in COMA. Modulation of the outgoing beacon signal may be performed by modulating the input signal, the output signal, or the local oscillator signal. An amplitude modulation circuit may be coupled between the LO and the mixer. A frequency modulation circuit may be coupled to the LO. Since instantaneous angular frequency is the derivative of instantaneous phase, phase modulation can be considered a special case of frequency modulation in which the carrier frequency modulation is given by the time derivative of the phase modulation. Both an AM circuit and phase or frequency modulation circuits may be incorporated to provide complex modulation. Alternatively, a quadrature mixer coupled to the input, LO, and outputs may be used to complex modulate one or more input signals to generate one or more output signals. Such modulation circuits may comprise a Pseudorandom Noise (PN) generator, such as a Linear Feedback Shift Register (LFSR). Circuits may be included for providing more sophisticated waveforms, up to full complex modulation, which may be generated and imposed on the outgoing beacon signal by use of a quadrature mixer driven by a real or complex arbitrary waveform source. This technique allows arbitrary modulation types (for example, AM, FM, PM, ASK, FSK, PSK, GMSK, QPSK, QAM, OFDM, DSSS, Chaotic, etc.) to be generated as part of the outgoing beacon signal.

In system and method aspects, a Radio Frequency (RF) interrogator transmits at a first frequency and receives at a second frequency, and performs range and direction finding of the wireless detection beacon based upon a received beacon signal at the second frequency. In accordance with the present invention, this technique allows the RF interrogator to transmit and receive at the same time on different frequencies, such that no gating of the receiver is required.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present invention will now be described with reference to FIGS. 1-7. Some embodiments of the present invention provide methods, systems, and apparatus relating to the acquisition of information concerning a remote beacon. Such information may include detecting the presence of a remotely located wireless detection beacon, determining a range of a remotely located beacon and/or determining the direction of a remotely located beacon.

Figure 1:
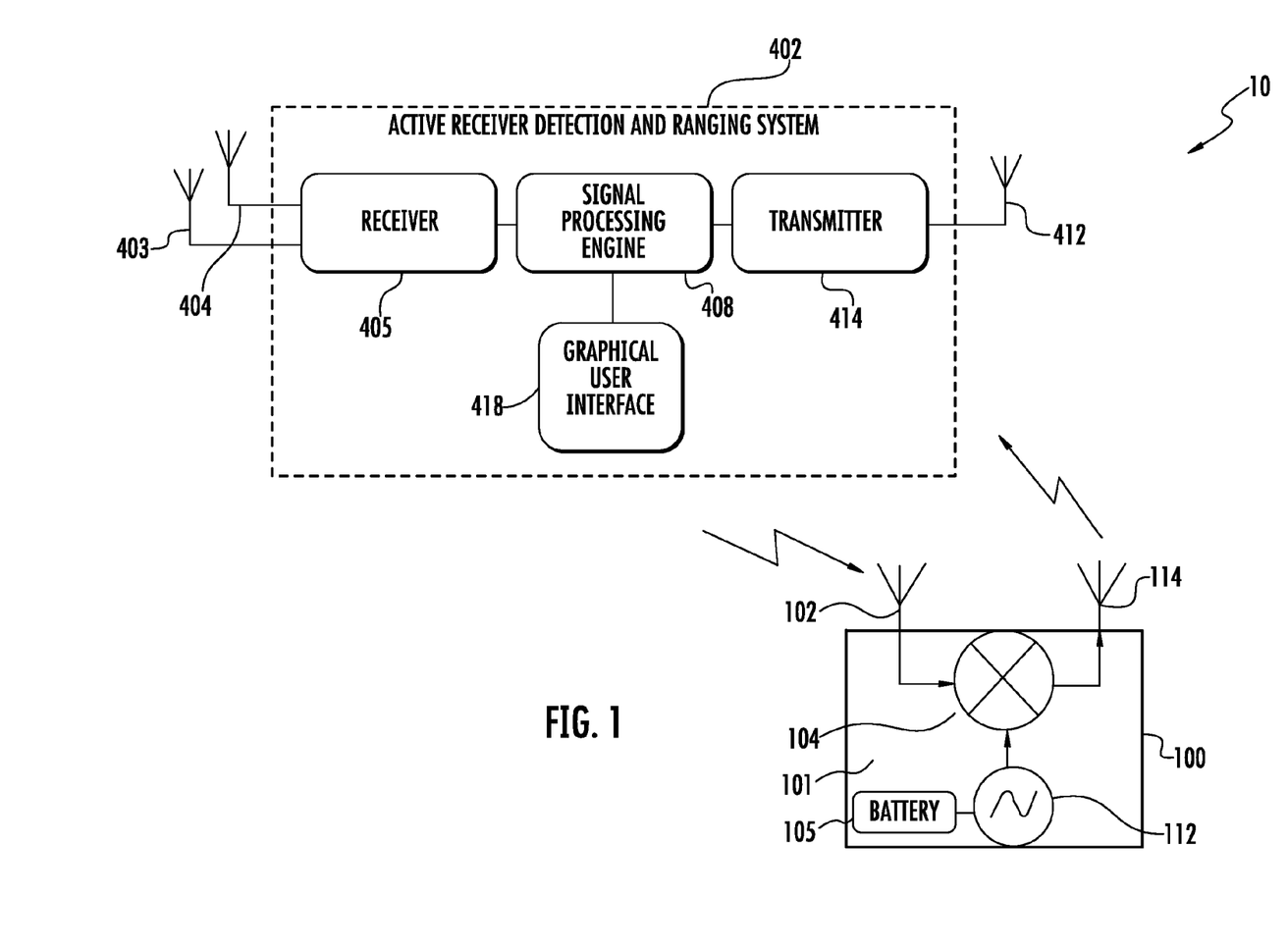
FIG. 1 is a schematic block diagram illustrating a wireless detection system including a wireless detection beacon in accordance with features of an embodiment of the present invention.

Referring now to FIG. 1, a wireless beacon detection system 10 including a wireless detection beacon 100 will be described. The beacon 100 includes an antenna 102 for converting electromagnetic waves incident on the beacon to RF electronic signals. The RF signals are communicated from the antenna 102 to a mixer or mixing circuit 104. A local oscillator (LO) 112 is used to generate a second RF signal referred to herein as the LO signal. The LO signal and the RF signals from the antenna 102 are mixed in the mixing device 104 to produce various mixing products which generally include a sum and difference frequency. The sum frequency is the sum of the frequencies of the received RF signal and the LO signal.

The difference frequency is the difference between the frequencies of the received RF signal and the LO signal.

Figure 3:
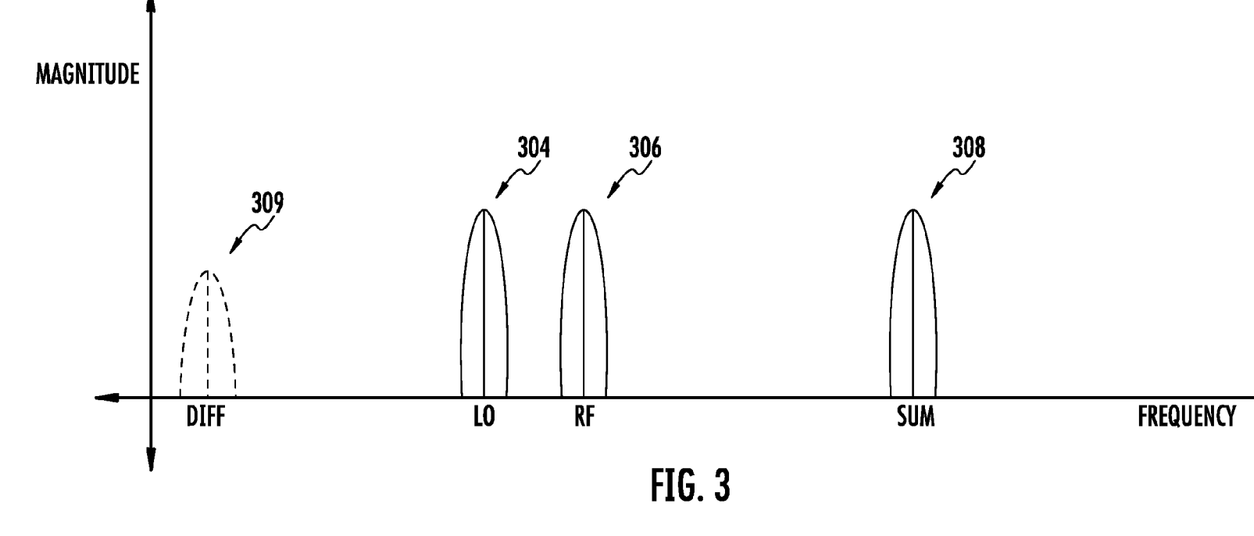
FIG. 3 is a plot of magnitude versus frequency for understanding the various signals that are associated with the wireless detection system in FIG. 1.

The relationship between these various signals is illustrated in FIG. 3, which shows an RF signal 306, an LO signal 304, and a sum mixing product signal 308, and difference mixing product signal 309. Within the mixer 104, the local oscillator signal interacts with the received RF signal to produce these mixing products at frequencies which are equal to the sum of the two input frequencies and difference of the two input frequencies.

The beacon 100 is designed for the purpose of receiving RF signals and re-radiating such RF signals mixed with the LO signal from the LO 112 to an output or transmit antenna 114. Those skilled in the art will appreciate that beacon 100 may in some cases be able to share a common antenna for both input and output. For example, a single antenna can be used if such antenna will provide acceptable performance for receiving and transmitting signals as hereinafter described. In that case, a single antenna can be used in place of antennas 102 and 114. The beacon antenna system may be printed onto substrate 101 to further reduce SWAP.

Those skilled in the art will appreciate that spreading of the signal can increase processing gain and generate a low profile signal. The low profile signal may allow operation of the beacon 100 and detection system in unlicensed FCC bands. The low complexity design (relatively low size, weight and power) is for low cost and ease of production. Since there is no signal decoding or other signal processing required in the beacon, this results in low power. In particular, a transmitted RF signal is used to cause a re-radiation of the RF signal mixed with the LO signal to be analyzed by a detector or interrogator which will be described in more detail below. This re-radiation can be detected and used to identify the beacon, and then further analyzed to provide useful information about the beacon, such as direction and range.

Referring again to FIG. 1, an interrogator such as an active receiver detection and ranging system (ARDRS) 402 will be described and is useful for understanding the invention. Such an ARDRS is described in further detail in U.S. Published Patent Application No. 2008/0070532 to Moffatt at al. and herein incorporated by reference in its entirety. The system includes one or more antennas 403/404 for acquisition of RF energy associated with RP emissions from a beacon 100. For example, the antenna 404 can include a directional antenna system capable of focusing antenna gain in a selected direction. The antenna 403/404 can include more than one antenna element for measuring frequency difference of arrival (FDOA), time difference of arrival (TDOA), phase differences, and/or amplitude differences between antenna elements for estimating an angle of arrival (AoA) from the wireless beacon for direction finding (DF) the wireless beacon. The RF energy from antenna 404 is communicated to an RF receiver or receiving device 405, which may include a demodulator, for example. The RF receiver 405 may be a Rake receiver as would be appreciated by those skilled in the art.

The RF receiver 405 is capable of receiving RF emissions. Those skilled in the art will appreciate that it may be desirable to obtain information concerning one or more different types of beacons 100. Accordingly, the RF receiver 405 may have a tuning range that covers RF emissions known to be associated with the various different types of beacons 100.

According to an embodiment of the invention, the RF receiver 405 has a relatively narrow receiver bandwidth that is capable of being tuned to one or more frequencies associated with known RF emissions. Alternatively, the receiver 405 can be a design that offers a bandwidth that is considerably larger. With a wider bandwidth design, the receiver 405 can provide the capability to concurrently receive one or more RF emissions at various different RF frequencies from various beacons simultaneously. As discussed above, these RF emissions are preferably a mixing product of the transmitted RF interrogation signal with an LO signal from the beacon 100.

Depending on the configuration of RF receiver 405, signal processing/demodulator circuitry 408 is configured to process an RF emission on a single RF frequency or concurrently process a plurality of RF emissions existing on multiple RF frequencies. The signal processing engine or signal processing/demodulator circuitry 408 may also include at least one demodulator. The demodulator may be advantageously selected to be of a type that is capable of providing a demodulated output in the form of a signal which is a representation of a variation associated with the RF emission. For example, a frequency modulation (FM) discriminator circuit could be used for this purpose. FM discriminator circuits are well known in the art and therefore will not be discussed here in detail.

Similarly, in 408 an AM demodulator can be used to detect variations in the amplitude of the RF emissions. Similarly, a phase modulation (PM) demodulator can be used to detect variations in the phase of the RF emissions. Similarly, a quadrature demodulator can be used to detect variations in both the magnitude and phase of the RF emissions. Similarly, a demodulator may be advantageously used to demodulate any combination or one or more of these modulation formats simultaneously. A demodulator can be used to decode a multi-carrier modulated waveform, estimate the RF channel, remove frequency offset, and provide an accurate range estimate to the wireless beacon.

The ARDRS 402 also includes a transmitter antenna 412 coupled to an RF transmitter 414. Those skilled in the art will appreciate that RF transmitter 414 may in some cases be able to share a common antenna with RF receiver 405. For example, a single antenna can be used if such antenna will provide acceptable performance for receiving and transmitting signals as hereinafter described. In that case, a single antenna can be used in place of antennas 403/404 and 412, provided that appropriate isolation and diplexing or switching circuitry is provided to isolate RF receiver 405 from high power signals originating with the RF transmitter 414. By choosing orthogonal RF frequencies, transmission and reception may occur simultaneously without interference. Still, since a location of a beacon 100 may be unknown, it can be desirable in some instances for a receiver antenna 404 to have a different antenna gain pattern as compared to the antenna gain pattern of a transmit antenna 412. In such cases, it can be more advantageous to use separate antennas.

The RF transmitter 414 may be a conventional design capable of transmitting RF signals on one or more frequencies that can be received by the beacon 100. It should be understood that beacon 100 can be of one or more different types. As such, different beacons 100 can have different operating frequency ranges. Accordingly, the transmitter 414 advantageously provides a transmit frequency range which includes frequencies at which one or more beacons 100 can receive signals. The RF transmitter 414 is excited by signal processing engine 408 which may include an RF signal generator. The RF signal generator can include a phase locked loop (PLL) type RF generator to provide a stable source of RF energy for the RF transmitter. The PLL preferably produces RF energy at a selectable frequency within the range of the RF transmitter 414, as would be appreciated by those skilled in the art.

The signal processing engine 408 may also include a modulation circuit. The modulation circuit can include one or more of a phase modulator, a frequency modulator, an amplitude modulator, a modulator matching the type of signal normally received by the beacon 100, and a modulator that advantageously maximizes the variations in the emission or emissions. If multiple types of modulators are used, suitable control circuitry can be provided for selectively operating one or more modulators. Those skilled in the art will appreciate that the capability to simultaneously separately amplitude modulate and phase modulate a signal can reproduce any and all types of modulation. The modulation circuitry, RF transmitter 414 and antenna 412 as described herein are generally known in the art and therefore will not be described in great detail. Example waveforms may include chirps, pseudorandom noise and/or multicarrier waveforms. Additional waveforms may include AM, FM, PM, ASK, FSK, PSK, GMSK, QPSK, QAM, OFDM, DSSS, and Chaotic, for example.

The signal processing engine 408 may be an ASIC, a microprocessor, a state machine, digital signal processor, or a general purpose computer which has been programmed with a suitable set of instructions for implementing the methods described herein. The signal processing engine 408 may include one or more devices suitable for storing a set of program instructions and/or data. For example, a data store can be provided for this purpose. Such a data store may include RAM, ROM, and a bulk data storage device, such as a magnetic disc drive, for example.

The signal processing engine 408 communicates with one or more of the components of the ARDRS 402 via a suitable data bus or control lines. For example, signal processing engine 408 may communicate command and control signals to control any functions performed by the RF receiver 405 and to control the output of RF transmitter 414. A plurality of signal paths and associated components may be used to detect signals at different frequencies or different sub-bands of frequencies, different modulation types, or any combination of these.

The signal processing engine provides direction finding and ranging to yield the geolocation of the wireless beacon. The signal processing engine may include a matched-filter or correlator for processing the received signal to provide increased processing gain for wireless beacon detection and geolocation. The processing gain achieved from the correlator allows much lower power signals to be transmitted to the beacon and received from the beacon. This processing gain allows the beacon to forego having an amplifier, allowing a lower SWAP beacon.

The signal processing engine 408 also communicates with a user interface or graphical user interface 418. The user interface may reside at the ARDRS processing site or may be remotely located and ARDRS may be remote controlled. The ARDRS may be configured as a remote stand-alone sensor for interrogating one or more beacons, and be configured for collection and logging of beacon telemetry and sensor data locations, and other relevant beacon information. The signal processing engine can provide DF and range information for one or more remote wireless beacons to the user interface for mapping the locations of one or more beacons. The user interface 418 can communicate information to a user regarding any beacon 100 detected by the ARDRS 402. For example, the user interface 418 can be used to identify a distance or range to the beacon 100, whether or not a beacon 100 is receiving a signal from the ARDRS 402, and the minimum transmit power necessary for signals to be received by the beacon 100. The user interface can provide path loss and multipath delay spread info to the user for analyzing the RF propagation channel. The user interface 418 can also provide the capability for a user to communicate input commands to control the operation of the ARDRS 402 as described.

Figure 2:
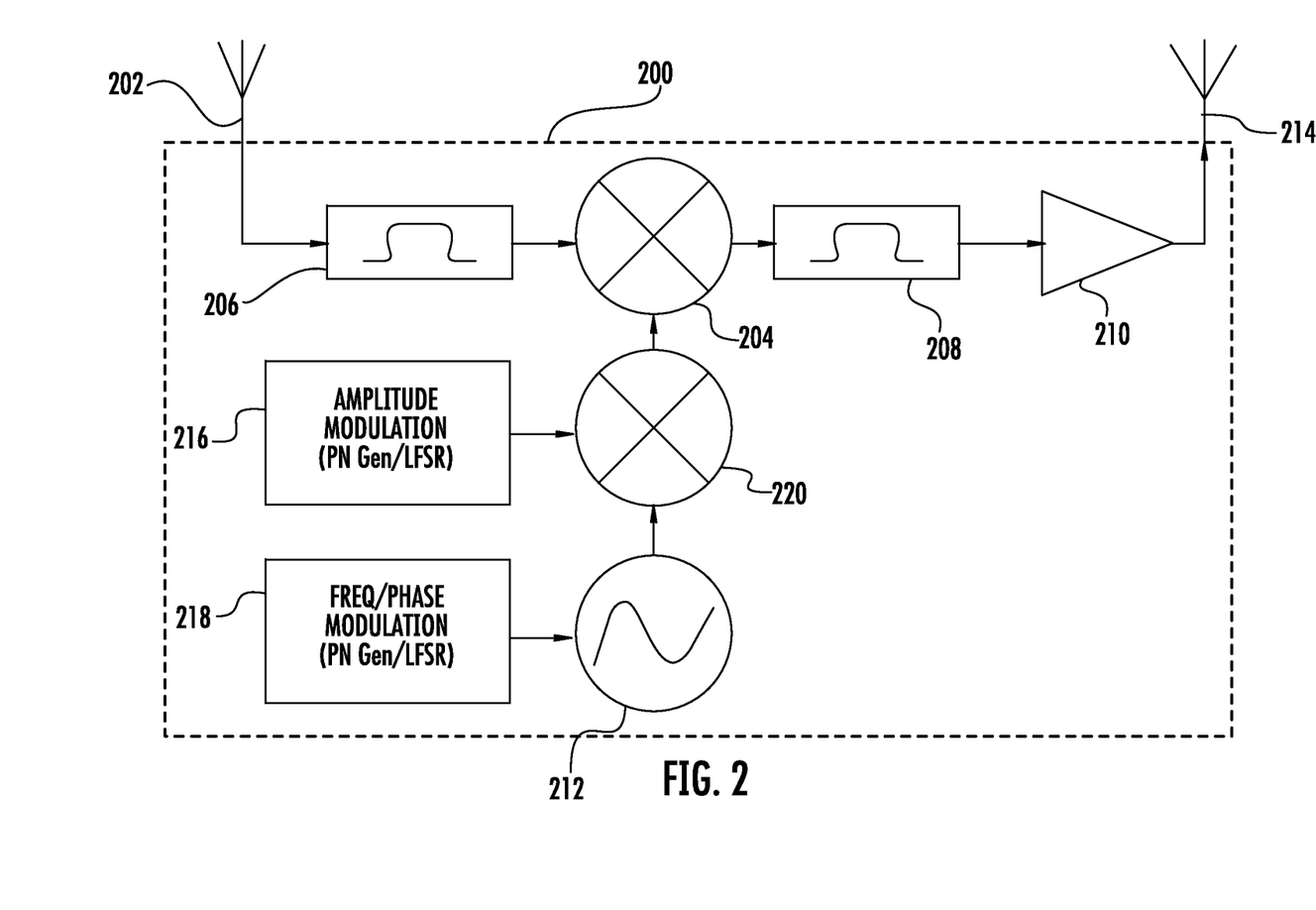
FIG. 2 is a schematic block diagram illustrating a wireless detection beacon in accordance with features of another embodiment of the present invention.

Referring more specifically to the embodiment of FIG. 2, beacon 200 provides one example of beacon identification capability for distinguishing between multiple deployed beacons. The beacon includes multiple optional components. It is expected that multiple beacon variations will be created that will employ none, some, or all of these optional components. The beacon 200 again includes input antenna 202 coupled to mixer 204 for mixing RF input signals with LO signals from LO 212 for re-radiation to the output antenna 214. The input antenna 202 and the output antenna 214 may be referred to individually or collectively as an antenna assembly. The beacon 200 illustratively includes an optional input path filter 206 and an optional output path filter 208, such as an RF band pass filter (BPS). Such a BPF limits the range of RF signals passed to subsequent components of the beacon. The beacon 100 may also include one or more optional RF amplification devices such as amplifier 210.

Modulation may occur at the beacon to cause distinction between multiple beacons, or impress additional data (such as sensor data, telemetry, etc.) on to the beacons return signal. Modulation may occur at the input signal, the LO signal, or the output signal for perturbing the return signal. An amplitude modulation circuit 216 may be coupled between the LO 212 and the mixer 204. A frequency and/or phase modulation circuit 218 may be coupled to the LO 212. Such modulation circuits may comprise a Pseudorandom Noise (PN) generator, such as a Linear Feedback Shift Register (LFSR). An additional mixer 220 may also be included.

Thus, a relatively simple wireless detection beacon 100/200, and associated system 10, for location detection and/or tracking has been described. The wireless detection beacon 100/200 is for use with a Radio Frequency (RF) interrogator 402 transmitting at a first frequency and receiving at a second frequency. The wireless detection beacon 100/200 includes a substrate 101, a power supply such as a battery 105 carried by the substrate, antenna assembly 102/202, 114/214 carried by the substrate, and a local oscillator (LO) 112/212 carried by the substrate and configured to be powered by the power supply to provide an LO signal at a third frequency. A mixer 104/204 is carried by the substrate 101 and coupled to the antenna assembly and the LO 112/212. The mixer 104/204 is configured to generate an outgoing beacon signal to the antenna assembly at the second frequency based upon mixing an incoming signal from the RF interrogator 402 at the first frequency with the LO signal at the third frequency.

The mixer 104/204 may be configured to generate the outgoing beacon signal as a mixing product signal at the second frequency defined by a difference or sum of the first and third frequencies (or integer multiples thereof) and permitting range and direction finding by the RF interrogator 402. The mixer 104/204 may be configured to instantly generate the outgoing beacon signal by re-radiating the incoming signal mixed with the LO signal. In accordance with the present invention, the beacon will generate the output signal without requiring any decoding of the incoming signal.

The active receiver detection and ranging techniques used with the beacon 100/200 provide for range to beacon (target) determination and improve direction finding using angle-of-arrival (AoA) measurements due to the wideband signals. The pseudorandom noise (PN) modulation and corresponding correlation of the PN sequence may provide the processing gain for detection and a time delay measurement for range estimation. As such, the disclosed embodiments do not require geolocation capabilities (e.g. GPS) at the remote beacon to provide range and direction determination as do conventional beacons. Such conventional beacons require precise time synchronization and expensive power consuming GPS chips. Also, such conventional beacons typically include active emissions of signals which require power amplifiers, more power consumption and limit operational life. Further, such conventional beacons decode the signal from RF interrogator before initiating a response signal and therefore require more processing circuitry and incur more latency than the present invention.

A method aspect is directed to a method for wireless detection of a beacon 100/200 using a Radio Frequency (RF) interrogator 402 to transmit at a first frequency and receive at a second frequency. The method includes providing the wireless detection beacon 100/200 including a substrate 101, a power supply 105, antenna assembly 102/114, a local oscillator (LO) 112/212 configured to be powered by the power supply to provide an LO signal at a third frequency. A mixer 104/204 is coupled to the antenna assembly 102/114 and the LO 112/212, and is configured to generate an outgoing beacon signal to the antenna assembly 114/214 at the second frequency based upon mixing an incoming signal from the RF interrogator 402 at the first frequency with the LO signal at the third frequency. The method includes performing range and direction finding of the wireless detection beacon with the RF interrogator 402 based upon a received beacon signal at the second frequency. Fine time resolution for accurate range estimation is provided at the RF interrogator using the multi-carrier waveform and corresponding signal processing. Therefore, the beacon does not require high time or frequency accuracy further reducing beacon cost and SWAP.

In such method, and as described above, the mixer 104/204 may generate the outgoing beacon signal as a mixing product signal at the second frequency defined by a difference/sum of the first and third frequencies (or integer multiples thereof) and permitting range and direction finding by the RF interrogator. The outgoing beacon signal is the return signal from the beacon that propagates over the channel from the beacon to the RF interrogator. The mixer 104/204 may generate the outgoing beacon signal by re-radiating the incoming signal mixed with the LO signal and without any decoding of the incoming signal. The method may also include providing amplitude modulation of the LO signal and/or providing phase/frequency modulation of the LO signal for distinguishing between multiple returns to provide beacon identification. The modulation may occur at the beacon input before the mixer at the first frequency, between the LO and the mixer at the third frequency, or at the beacon output at the second frequency in order to perturb the outgoing beacon signal. The modulated bit sequence may be generated from a LFSR, other digital source, or may be generated by software or firmware to encode information. The LO signal may also be modulated with a real or complex arbitrary waveform, and may be mixed with the received signal using a quadrature mixer.

Figure 4:
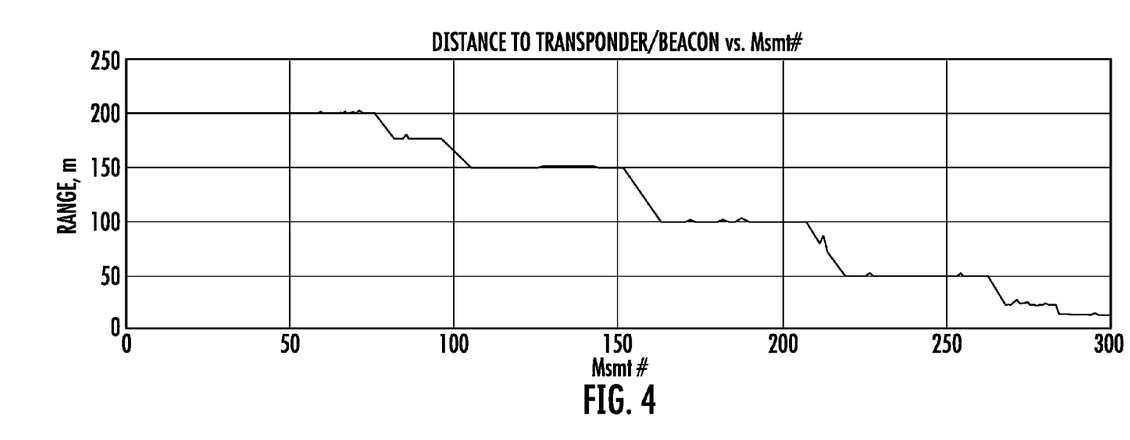
FIG. 4 is a range graph for a beacon using the wireless detection system of FIG. 1.
Figure 5:
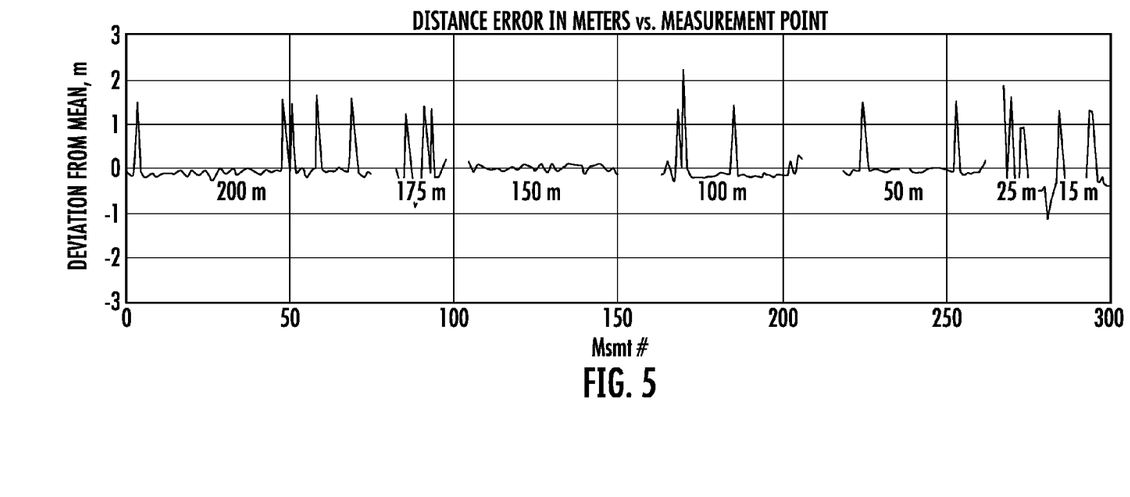
FIG. 5 is a distance error graph corresponding to the graph of FIG. 4.
Figure 6:
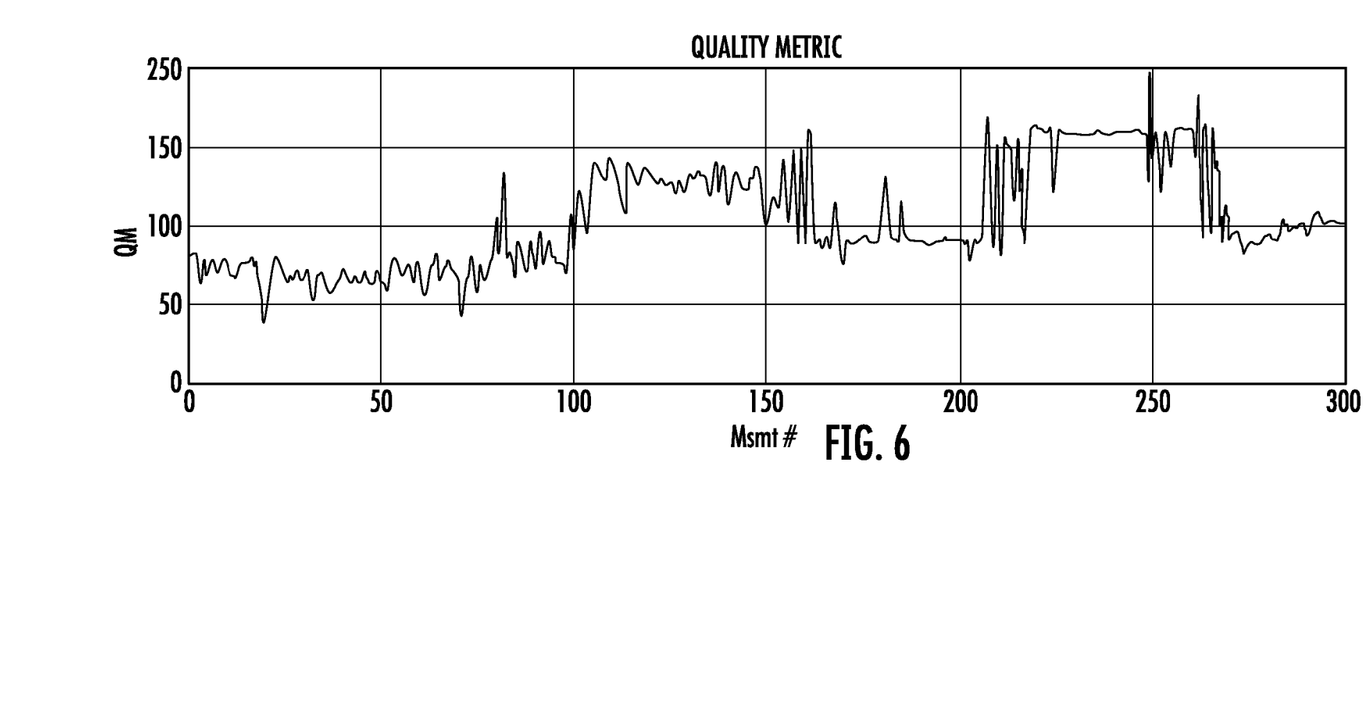
FIG. 6 is a quality metric graph for a beacon using the wireless detection system of FIG. 1.
Figure 7:
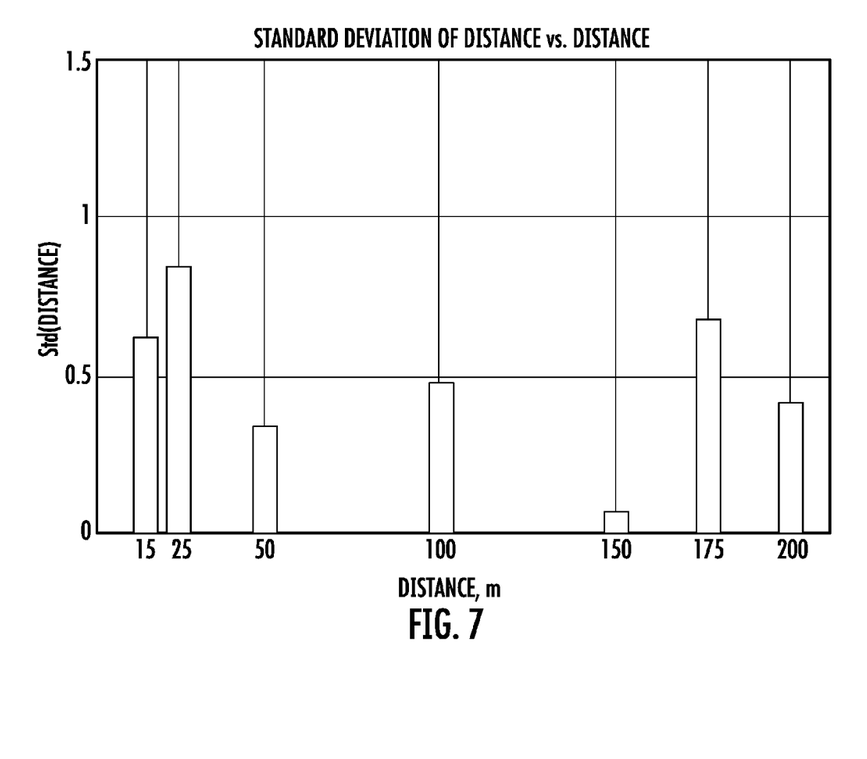
FIG. 7 is a bar graph illustrating standard deviation of measured distance versus actual distance for the cooperating beacon using the wireless detection system of FIG. 1.

Now referring to FIGS. 4-7, an exemplary wireless beacon detection system 10 as desired herein was field tested. FIG. 4 is a graph of periodic raw measurement data plotted as a distance to a beacon as the distance is reduced in stages from 200 meters to 15 meters with a dwell at each stage. FIG. 5 is a corresponding measurement error over range graph of FIG. 4. A distance error from a mean is computed for each dwell period. The distance was measured at the RP interrogator in the signal processing engine and provided to the graphical user interface. FIG. 6 is a corresponding quality metric plotted as the distance to the beacon is reduced from 200 meters to 15 meters corresponding to data points in FIG. 4. The quality metric provides the user with an indication of the range accuracy from each RF interrogation response. The quality metric is a function of multiple parameters, including signal-to-noise ratio. A higher quality metric represents the potential for higher range accuracy. FIG. 7 is a standard deviation of measured distance versus actual distance graph for the cooperating beacon. The difference between the measured distance and actual distance is the distance error. The standard deviation is computed at each dwell and plotted versus distance. Note that there are no significant variations in standard deviation as the distance is varied.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless detection beacon for use with a Radio Frequency (RF) interrogator transmitting at a first frequency and receiving at a second frequency, the wireless detection beacon comprising:
    a substrate;
    a power supply carried by said substrate;
    an antenna assembly carried by said substrate;
    a local oscillator carried by said substrate and configured to be powered by said power supply to provide a local oscillator signal at a third frequency;
    a mixer carried by said substrate and coupled to said antenna assembly and the local oscillator, said mixer configured to generate an outgoing beacon signal to the antenna assembly at the second frequency based upon mixing an incoming signal from the RF interrogator at the first frequency with the local oscillator signal at the third frequency, said second frequency comprising a difference/sum of the first and third frequencies and operable for range and direction finding by the RF interrogator;
    wherein said antenna assembly comprises an input antenna configured to receive the incoming signal, and an output antenna configured to transmit the outgoing beacon signal, said mixer being coupled therebetween;
    a first filter coupled between said input antenna and said mixer;
    a second filter coupled between said mixer and said output antenna; and
    an amplitude modulation circuit coupled between said local oscillator and said mixer, and configured to modulate the outgoing beacon signal at the second frequency to provide beacon identification.

2. The wireless detection beacon according to claim 1, wherein said mixer is configured to generate the outgoing beacon signal by re-radiating the incoming signal mixed with the local oscillator signal and without any decoding of the incoming signal.

3. The wireless detection beacon according to claim 1, wherein said amplitude modulation circuit comprises a Pseudorandom Noise (PN) generator.

4. The wireless detection beacon according to claim 3, wherein said PN generator comprises a Linear Feedback Shift Register.

5. The wireless detection beacon according to claim 1, further comprising a frequency modulation circuit configured to modulate said outgoing beacon signal at the second frequency.

6. The wireless detection beacon according to claim 5, wherein said frequency modulation circuit comprises a chirp generator.

7. The wireless detection beacon according to claim 1, further comprising a quadrature modulation circuit configured to complex modulate said outgoing beacon signal at the second frequency.

8. A wireless detection system comprising:
a Radio Frequency (RF) interrogator configured to transmit at a first frequency and receive at a second frequency; and
a wireless detection beacon comprising
a substrate,
a power supply carried by said substrate,
an antenna assembly carried by said substrate,
a local oscillator carried by said substrate and configured to be powered by said power supply to provide a local oscillator signal at a third frequency, and
a mixer carried by said substrate and coupled to said antenna assembly and the local oscillator, said mixer configured to generate an outgoing beacon signal to the antenna assembly at the second frequency based upon a mix of an incoming signal from the RF interrogator at the first frequency with the local oscillator signal at the third frequency, said second frequency comprising a difference/sum of the first and third frequencies and operable for range and direction finding by the RF interrogator,
wherein said antenna assembly comprises an input antenna configured to receive the incoming signal, and an output antenna configured to transmit the outgoing beacon signal, said mixer being coupled therebetween,
a first filter coupled between said input antenna and said mixer,
a second filter coupled between said mixer and said output antenna, and
an amplitude modulation circuit coupled between said local oscillator and said mixer, and configured to modulate the outgoing beacon signal at the second frequency to provide beacon identification;
said RF interrogator configured to perform range and direction finding, and identification, of the wireless detection beacon based upon a received beacon signal at the second frequency.

9. The wireless detection system according to claim 8, wherein said mixer is configured to generate the outgoing beacon signal by re-radiating the incoming signal mixed with the local oscillator signal and without any decoding of the incoming signal.

10. The wireless detection system according to claim 8, further comprising a frequency modulation circuit configured to modulate said outgoing beacon signal at the second frequency.

11. A method for wireless detection comprising:
using a Radio Frequency (RF) interrogator to transmit at a first frequency and receive at a second frequency; and
providing a wireless detection beacon comprising
a substrate,
a power supply carried by said substrate,
an antenna assembly carried by said substrate,
a local oscillator carried by said substrate and configured to be powered by said power supply to provide a local oscillator signal at a third frequency, and
a mixer carried by said substrate and coupled to said antenna assembly and the local oscillator, said mixer configured to generate an outgoing beacon signal to the antenna assembly at the second frequency based upon mixing an incoming signal from the RF interrogator at the first frequency with the local oscillator signal at the third frequency,
said second frequency comprising a difference/sum of the first and third frequencies and operable for range and direction finding by the RF interrogator,
wherein said antenna assembly comprises an input antenna configured to receive the incoming signal, and an output antenna configured to transmit the outgoing beacon signal, said mixer being coupled therebetween,
a first filter coupled between said input antenna and said mixer,
a second filter coupled between said mixer and said output antenna, and
an amplitude modulation circuit coupled between said local oscillator and said mixer, and configured to modulate the outgoing beacon signal at the second frequency to provide beacon identification;
performing range and direction finding, and identification, of the wireless detection beacon with the RF interrogator based upon a received beacon signal at the second frequency.

12. The method according to claim 11, wherein the mixer generates the outgoing beacon signal by re-radiating the incoming signal mixed with the local oscillator signal and without any decoding of the incoming signal.

13. The method according to claim 11, further comprising providing frequency modulation of outgoing beacon signal at the second frequency.

* * * * *